E. D. TREANOR.
WINDING MACHINE.
APPLICATION FILED MAR 26, 1921.
1,413,367.
Patented Apr. 18, 1922.
2 SHEETS—SHEET 1.
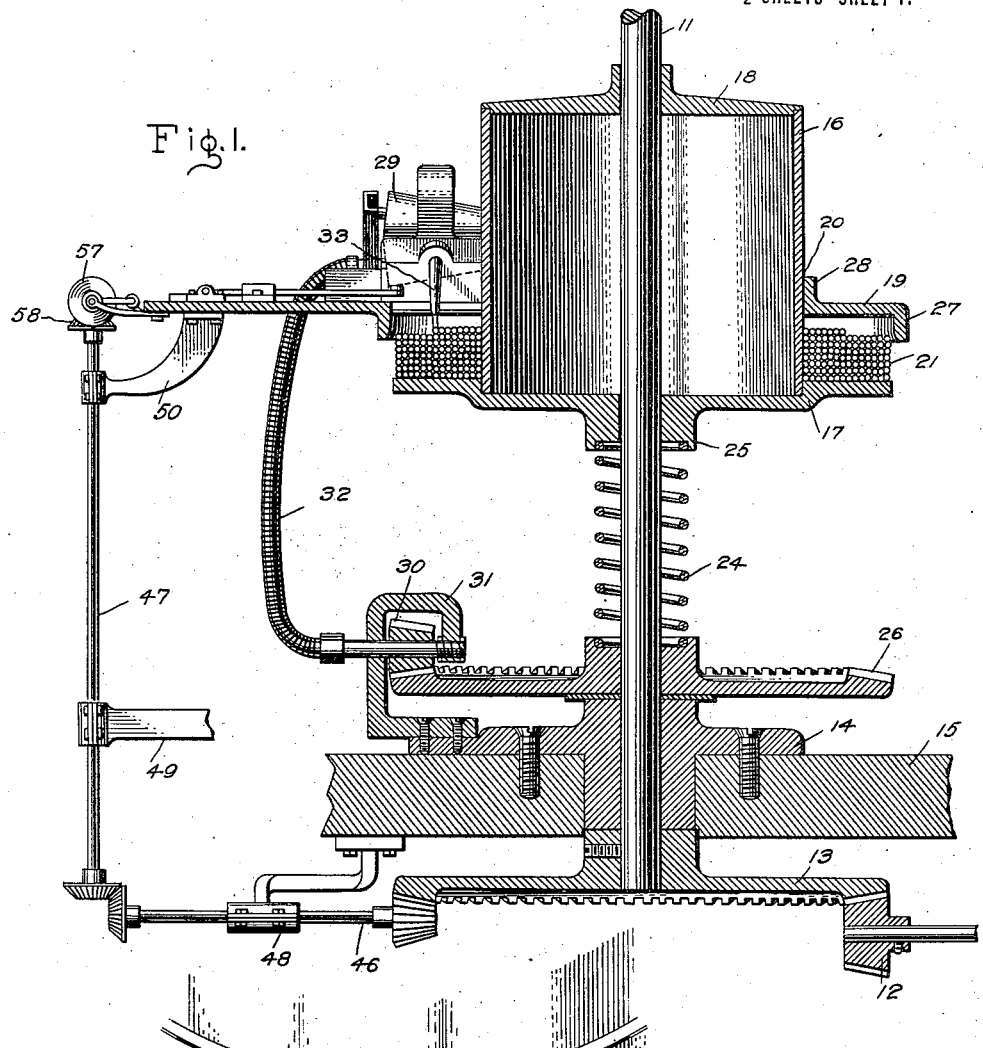
Fig.1.
Fig.3.
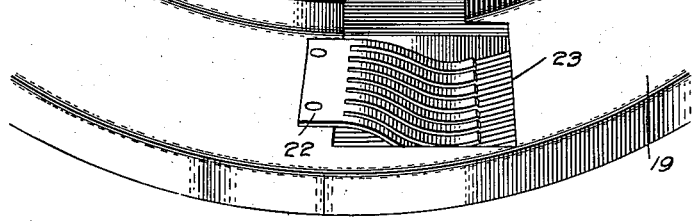
Inventor:
Edward D. Treanor,
by His Attorney.

E. D. TREANOR.
WINDING MACHINE.
APPLICATION FILED MAR. 26, 1921.
1,413,367.
Patented Apr. 18, 1922.
2 SHEETS—SHEET 2.
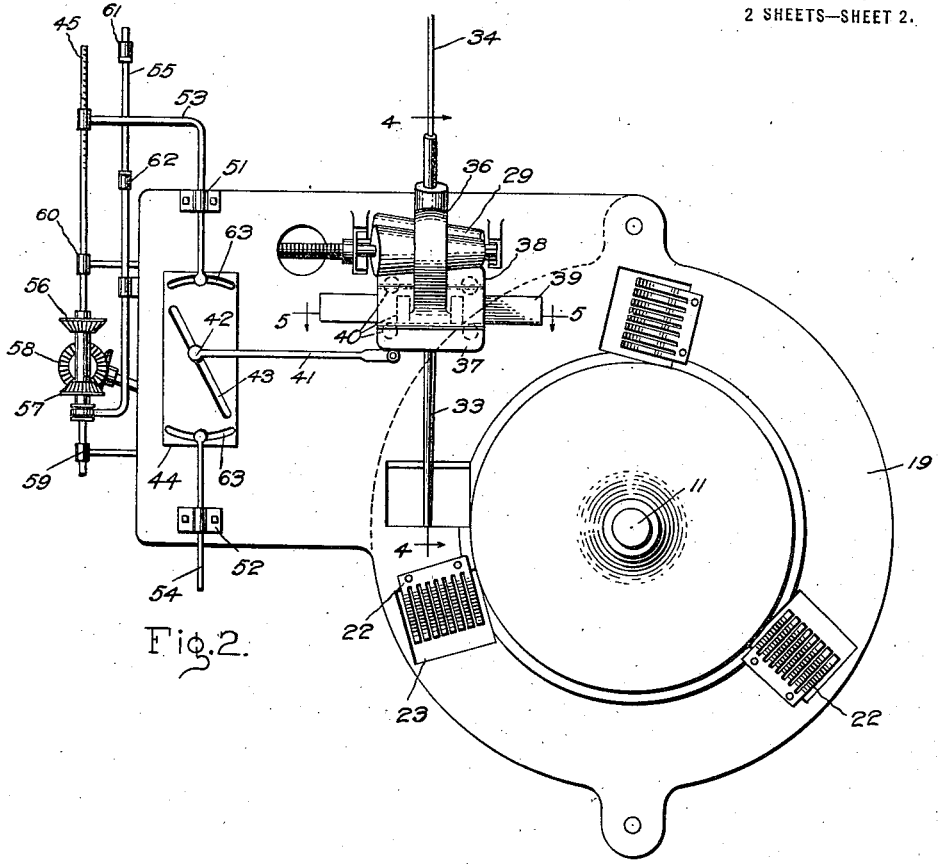
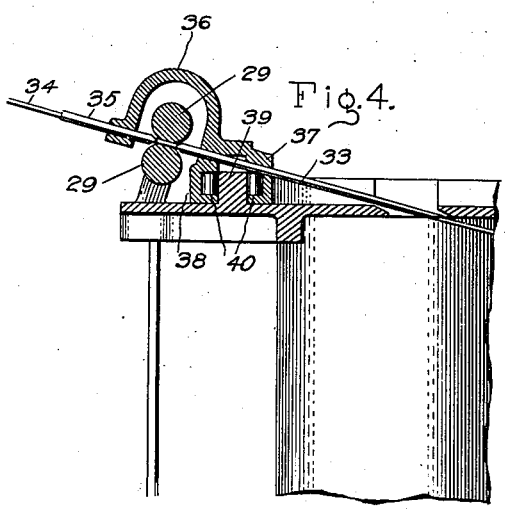
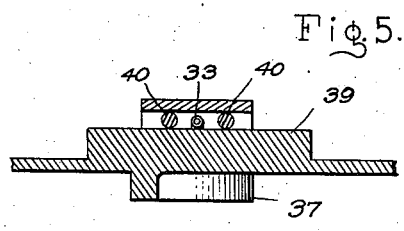
Inventor:
Edward D. Treanor,
by Albert G. Davis
His Attorney.

UNITED STATES PATENT OFFICE.

EDWARD D. TREANOR, OF PITTSFIELD, MASSACHUSETTS, ASSIGNOR TO GENERAL ELECTRIC COMPANY, A CORPORATION OF NEW YORK.

WINDING MACHINE.

1,413,367.  Specification of Letters Patent.  Patented Apr. 18, 1922.

Application filed March 26, 1921. Serial No. 455,849.

*To all whom it may concern:*

Be it known that I, EDWARD D. TREANOR, a citizen of the United States, residing at Pittsfield, in the county of Berkshire, State of Massachusetts, have invented certain new and useful Improvements in Winding Machines, of which the following is a specification.

This invention relates to machines for winding coils from an electrical conductor, and more particularly to a type of machine in which a conductor is wound in a series of flat spirals.

When an electrical coil is wound, as for example, for use in transformers, it is highly important to have the space occupied by the coil as small as possible. With coils which need a comparatively large amount of insulation, on account of a high impressed electromotive force, the space taken up by the insulation is necessarily comparatively large as compared with the actual space occupied by the conductor itself. When only a few layers of conductors are wound, more insulation between layers is required for the same impressed electromotive force. It is thus evident that the larger the number of layers, the smaller is the electromotive force between layers, and the less the insulation required between them. One way in which the number of layers may be increased in the case of coils of spool formation, that is, coils which have a relatively long cylindrical body, is to wind the layers in successive flat spirals, instead of in the form of cylinders. In other words, successive spirals are wound somewhat of the shape of an ordinary clock spring, and each flat spiral placed on top of the other. In this way the axial length of the winding grows as successive spirals are wound. The utility of this form of coil for reasons of space economy has already been well recognized, but difficulties have arisen when attempts were made to wind such coils by machinery. These difficulties usually arose from the fact that the spirals as they are wound must be supported, so that they will not unwind or become displaced with relation to the other layers. Furthermore, the question of feeding the conductor at a proper rate to the spiral as it is wound brought up a great many mechanical difficulties, since when the conductor is fed too fast the spiral may not be properly formed and if not fed fast enough the tension on the conductor as it is being pulled by the spiral itself may become too great. It is the main object of my invention to overcome these difficulties and to provide a simple and efficient mechanism whereby coils of the sort described may be conveniently wound.

For a better understanding of my invention, reference is to be had to the following description taken in connection with the accompanying drawings, in which Fig. 1 is a sectional view of the entire machine; Fig. 2 is a top plan view of the same; Fig. 3 is a detail perspective view from the top of the machine; Fig. 4 is a sectional view along the line 4—4 in Fig. 2 illustrating the way in which the conductor is fed to the coil; and Fig. 5 is another sectional view along the lines 5—5 of Fig. 2 showing the slidable support for the conductor.

Referring now more in detail to the drawings, in which like reference characters refer to like parts throughout, the main shaft 11 of the machine is arranged to be rotated by any appropriate means. In this instance the rotation is shown as effected through the bevel gears 12 and 13, clearly illustrated in Fig. 1. An appropriate stationary bearing 14 properly fastened to a stationary frame 15 is provided for the shaft 11. This shaft serves to rotate a cylindrical coil support or spool 16 and a rotatable presser plate 17, which two members serve to support the coil as it is wound, in the manner shown in Fig. 1. The cylindrical support 16 is appropriately supported at its upper end by the flange 18 splined to the shaft 11 to permit relative axial movement. There is also a spline connection between the rotatable presser plate 17 and the shaft 11.

A stationary table member 19 having an aperture 20 therethrough serves to support means for supporting the spiral in the coil 21 as the spiral is wound. These means in the present instance comprises a plurality of stationary spring fingers 22 most clearly shown in Figs. 2 and 3. These spring fingers are split so as to increase their flexibility in a lateral direction and are so supported in the part of the stationary table member 19 that they pass through appropriate square shaped apertures 23 to coact with the rotatable presser member 17 to support the spirals. There is also provided appropriate means for urging the presser plate 17 and the spring fingers 22 yieldingly together as, for example, by means of the compression spring 24, one end of which acts against the hub 25 of the rotatable presser plate 17 and the other against the hub of a bevel gear 26 keyed to the shaft 11, which bevel gear serves to drive the feeding mechanism of the machine.

It is evident that thus far described I provide a plurality of pressure means which are relatively movable to each other, one of said means comprising stationary spring fingers 22 and the other comprising the rotatable presser plate 17. Due to the fact that each spring finger 22 is split in the manner shown, no trouble is experienced in supporting any portion of a spiral which may be wound, since each section of the spring finger 22 is independently flexible. The stationary table member 19 is provided with the depending flange 27 which serves to prevent the outermost turns of each spiral from dropping off as they are wound. A flange 28 is also provided thereon to support the slidable bearing for the cylindrical coil support 16.

Reference was made at the beginning of this specification that care should be taken to feed the conductor to the spirals as the machine is rotated at the proper rate. I have found that it is very advantageous to feed this conductor at a speed synchonous with that at which it is wound. In this way just the right amount of conductor is fed and the turns lie securely one against the other. To perform this function, I provide a pair of feeding cones 29 driven appropriately from the same means as serves to drive the shaft 11. In this instance bevel gear 26 serves as a driving means for the cones. The rotation of bevel gear 26 is transmitted by means of the bevel gear 30 properly supported in a bearing member 31 carried by the stationary support 15. Bevel gear 30 serves to drive appropriate shafting connecting to the cones 29. In this instance a flexible shaft 32 is utilized for this purpose, since by this means fewer parts are needed to transmit this motion. This flexible shaft driven in synchronism with the presser plate 17 serves to drive the cones 29 also at synchronous speed. The axes of the cones are so arranged that the nozzle 33 through which the conductor passes has a direction that is perpendicular thereto. The conductor 34 passes through the bite of the cones 29, as clearly shown in Fig. 4, and is supported after it passes through the bite of these cones by the nozzle 33 and before it passes through the bite of the cones by a tubular member 35. It is evident that as the nozzle 33 is made to move toward and from the axis of the main shaft 11 the conductor 34 moves axially of the cones 29 and is fed at varying speeds thereby. The small end of the cones are arranged nearer the center of the shaft 11 so that when the radius of the spiral is least, then the peripheral speed of that point of the cones where the conductor passes through is also the least. Upon movement of the conductor away from the axis of shaft 11 the nozzle 33 also moves in the same direction and causes the conductor 34 to be engaged at such a point in the bite of the cones 29 that the peripheral speed of these cones is greater. By proper dimensioning of the parts, the increase in speed may be made exactly that required to feed the conductor at a speed synchronous with that at which it is wound.

To guide the nozzle 33 and the tube 35 in the proper direction for winding the coil, there is provided a slidably supported guide means placed adjacent the bite of the cones. This guide means comprises the U-shaped member 36 through which pass the nozzle 33 and the tubular member 35. The U-shaped member 36 is in this instance formed integral with a pair of legs 37 and 38 which straddle a projection 39 carried by the stationary table member 19, as clearly shown in Figs. 2 and 5. Appropriate roller bearings 40 may be provided on the members 37 and 38 so as to reduce as much as possible the friction incident to the sliding upon the projection 39. When the machine is started the support 36 may be moved upon a stationary projection 39 by hand so as to wind the coils in the proper way. However, other appropriate means may be provided for sliding the supporting means 36 as the machine is rotated.

In the present instance I illustrate a means which I do not claim in this application but which is covered in the application Serial No. 455,848, filed of even date herewith in my name and assigned to the same assignee as this application, entitled Winding machine. This mechanism comprises a connecting rod 41 mechanically connected to the member 37 as shown in Fig. 2, the other end of which carries a pin 42 engaged in a slot 43 located in a slidable cam member 44. The slot 43 has an axis diagonal with the axis of movement of the guide means 36 and it is therefore evident that as the member 44 moves in a vertical direction as viewed in Fig. 2, the connecting rod 41 is made to move in a horizontal direction and thereby to cause the guide member 36 to move in the same direction. The movement of member 44 is effected by means of a screw shaft 45 driven from the bevel gear 13 by means of the shaftings 46 and 47 appropriately supported in stationary bearing members 48, 49 and 50. Sliding supports 51 and 52 are provided for the members 53 and 54 which connect to the plate 44. There is provided appropriate means for reversing the movement of the plate 44 upon the completion of the winding of any spiral. This means comprises the push rod 55 which is operated by movement of the member 53 to reverse by any appropriate means the rotation of the screw shaft 45. To perform this function there is rigidly connected a pair of opposed bevel gears 56 and 57 splined to the shaft 45, and with one of which coacts the bevel gear 58 driven from the shafting 47. The screw shaft 45 is appropriately supported on stationary bearings 59 and 60 as shown in Fig. 2. The push rod 55 is arranged to slide the bevel gears 56 and 57 in one direction or the other to cause the bevel gear 58 to be disengaged from one of the two bevel gears 56 and 57 and to engage with the other, in this way reversing the direction of the drive of screw shaft 45. The push rod 55 carries adjustable stops 61 and 62 by means of which the number of revolutions of the shaft 45 in one direction or the other may be adjusted. This number of revolutions being directly proportional to the number of revolutions of the main shaft 11, determines the number of turns in any one layer. The size of the conductors, however, would make a difference in how great the movement should be of the guide means 36. To adjust for the size of the conductor, the position of the plate 44 is made adjustable by means of the arcuate slots 63 so as to allow the inclination of the guiding slot 43 to be varied. It is evident, for example, that by adjusting the plate 44 so as to cause the slot 43 to be more nearly horizontal, a greater lateral movement would be given to the rod 41, while if the axis of the slot 43 were more nearly vertical this movement would be reduced.

The operation of the machine in winding a plurality of flat spirals is as follows: The conductor 34 is led through the tubular member 35 through the bite of the cones 29 and the nozzle 33. The end of the conductor is first properly anchored to the rotatable presser plate 17 in any appropriate fashion. The plate 44 is then adjusted for the proper width of the layers which will be wound and the adjustable stops 61 and 62 are adjusted to take care of the number of turns that are to be wound in each layer. The machine is then started. No further operation is then needed, since the slidable guide means 36 moves back and forth at the proper rate to cause the conductor 34 to be fed synchronously at the rate at which it is wound, as explained heretofore. As each succeeding layer is wound, the spring 24 is compressed more and more. The spring fingers 22 support the spirals and prevent any displacement of these spirals with relation to those already wound on the coils.

While I have shown in the accompanying drawings but one embodiment of my invention, I do not wish to be limited thereto but desire to embrace in the appended claims all modifications falling fairly within the scope of my invention.

What I claim as new and desire to secure by Letters Patent of the United States, is:—

1. In a machine for winding coils in flat spirals, a rotatable presser plate, a plurality of stationary spring fingers coacting with the rotatable presser plate to support the spirals, and means urging said presser plate and spring fingers together.

2. In a machine for winding coils in flat spirals, a rotatable presser plate, a stationary member carrying a plurality of spring fingers between which and the rotatable plate the spirals are wound, and means urging said plate and spring fingers together.

3. In a machine for winding coils in flat spirals, a presser plate, pressure means between which plate and means the spirals are wound, and means for feeding the conductor to the spiral at a speed synchronous with that at which the conductor is wound.

4. In a machine for winding coils in flat spirals, a rotatable presser plate, stationary pressure means, between which plate and means the spirals are wound, and means for feeding the conductor to the spiral at a speed synchronous with that at which it is wound.

5. In a machine for winding coils in flat spirals, a rotatable presser plate, a plurality of stationary spring fingers coacting with the rotatable presser plate to support the spirals, means urging said presser plate and spring fingers together, and means for feeding the conductor to the spiral at a speed synchronous with that at which it is wound.

6. In a machine for winding coils in flat spirals, means for supporting said spirals as they are wound, and means for feeding the conductor to the spiral at a speed synchronous with that at which it is wound.

7. In a machine for winding coils in flat spirals, a plurality of means for supporting said spirals as they are wound, means for rotating one of said means, and a pair of cones rotated by said means, said cones serving to feed the conductor to the spiral.

8. In a machine for winding coils in flat spirals, a rotatable presser plate, a plurality of stationary spring fingers coacting with the rotatable presser plate to support the spirals, means urging said presser plate and spring fingers together, means for rotating the presser plate, and a pair of cones rotated by said means, said cones serving to feed the conductor to the spiral.

9. In a machine for winding coils in flat spirals, a plurality of means for supporting said spirals as they are wound, means for rotating one of said means, a pair of cones rotated by said latter means, said cones serving to feed the conductor to the spiral, and a slidable support for the conductor adjacent the bite of the cones.

10. In a machine for winding coils in flat spirals, a rotatable pressure plate, a plurality of stationary spring fingers coacting with the rotatable presser plate to support the spirals, means urging said presser plate and spring fingers together, means for rotating the presser plate, a pair of cones rotated by said latter means, said cones serving to feed the conductor to the spiral, and a slidable support for the conductor adjacent the bite of the cones.

11. In a machine for winding coils in flat spirals, a rotatable presser plate, a cylindrical coil support carried by said presser plate, a stationary table member having an aperture through which said cylindrical support may pass, a plurality of split spring fingers supported from said table member and arranged to cooperate with the rotatable presser plate to support the spirals as they are wound, and means for urging said fingers and presser plate yieldingly toward each other.

12. In a machine for winding coils in flat spirals, a rotatable presser plate for supporting said spirals as they are wound, and means for feeding the conductor to the spirals comprising a pair of cones, a flexible shaft for driving said cones, and slidably supported guide means for the conductor as it passes through the bite of the cones, the flexible shaft being arranged to be driven in synchronism with the presser plate.

In witness whereof, I have hereunto set my hand this 15th day of Feb. 1921.

EDWARD D. TREANOR.